United States Patent [19]
Brun et al.

[11] Patent Number: 5,519,737
[45] Date of Patent: May 21, 1996

[54] ADAPTER FOR THE CONNECTION TO A CLEAR-CHANNEL TELECOMMUNICATION NETWORK

[75] Inventors: Alain Brun; Jean-marc Cazaentre, both of Antibes; Henri Giuliano, Vence; Patrick Sicsic, LaColleSurLoup, all of France

[73] Assignee: International Business Machines Corporation, Armonk, N.Y.

[21] Appl. No.: 48,598

[22] Filed: Apr. 19, 1993

[30] Foreign Application Priority Data

Sep. 25, 1992 [EP] European Pat. Off. ............. 92480131

[51] Int. Cl.$^6$ ............................... H03D 3/24; H04J 3/06
[52] U.S. Cl. ........................ 375/376; 375/294; 375/375; 370/100.1; 370/105.3
[58] Field of Search ................................... 375/373, 376, 375/219, 313, 376; 370/100.1, 103, 105, 105.3

[56] References Cited

U.S. PATENT DOCUMENTS

| | | | |
|---|---|---|---|
| 4,140,975 | 2/1979 | Cochran et al. | 333/165 |
| 4,860,285 | 8/1989 | Miller et al. | 370/100.1 |
| 5,125,009 | 6/1992 | DeVilbiss | 375/356 |
| 5,311,511 | 5/1994 | Reilly et al. | 370/84 |

OTHER PUBLICATIONS

TBD, vol. 29, No. 2, Jul. 1986, "Clock Recovery Circuit Based on Preset Counter".
Data Communications, RS499: cornerstone for the 1980s, by Hardeman, pp. 67–71.
A VLSI Device Provides 144 KBPS Full Duplex Data Transmission Supporting ISDN Basic, by Mannone, Ontario pp. 670–673, Paper No. 85296 Session 29.

*Primary Examiner*—Young T. Tse
*Assistant Examiner*—William Luther
*Attorney, Agent, or Firm*—Jerry W. Herndon; Joscelyn G. Cockburn

[57] ABSTRACT

An adapter having a line interface circuit for providing an analog attachment to a network (100). The line interface circuit is provided with a reset input for beginning a resynchronization of the timing of the adapter. The adapter further includes a Digital Phase-locked Loop device DPLL (203) driven by a master clock (306) which provides the timing and synchronization signals to the line interface circuits (201). The DPLL (203) divides a master clock down to an internal INT clock (309), a phase comparator (303) compares the INT clock with a reference signal (302) which is synchronized with the receive clock (202) extracted from the line by line interface (201). The phase comparison process operates with a Correction Signal (CS) which has a window centered around the falling edge of the INT clock. A frequency correction is initiated when the reference clock falls outside of the correction window and is achieved by inserting or suppressing a master clock pulse at this time. The adapter further includes means for resetting the line interface circuits and the DPLL at the power-on of the adapter, such that the frequency correction apparatus of the adapter causes two adapters attached at separate ends of a transmission medium to evolve toward stable timing states with respect to each other.

8 Claims, 9 Drawing Sheets

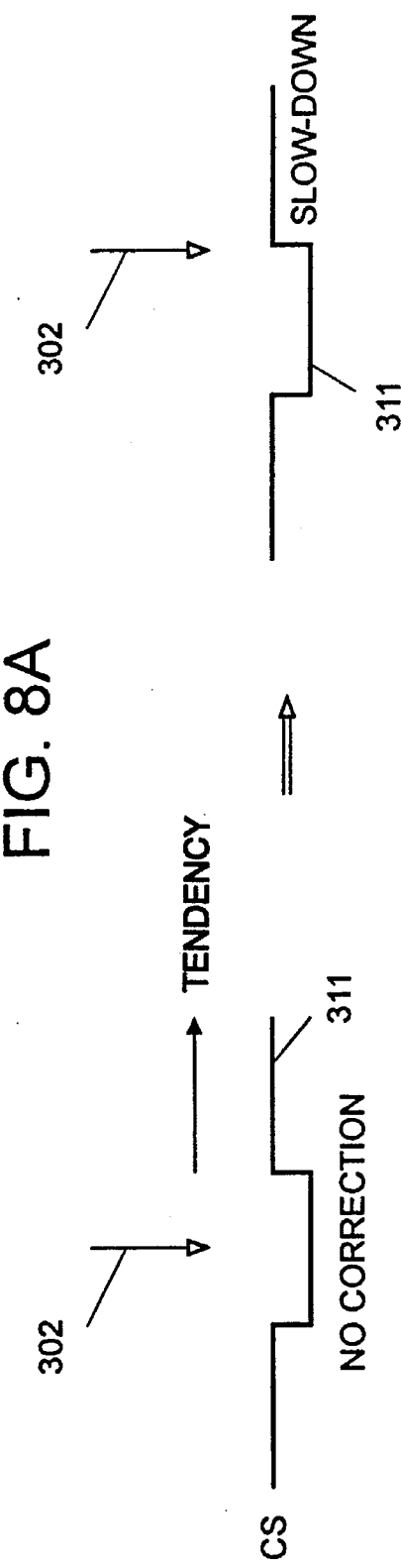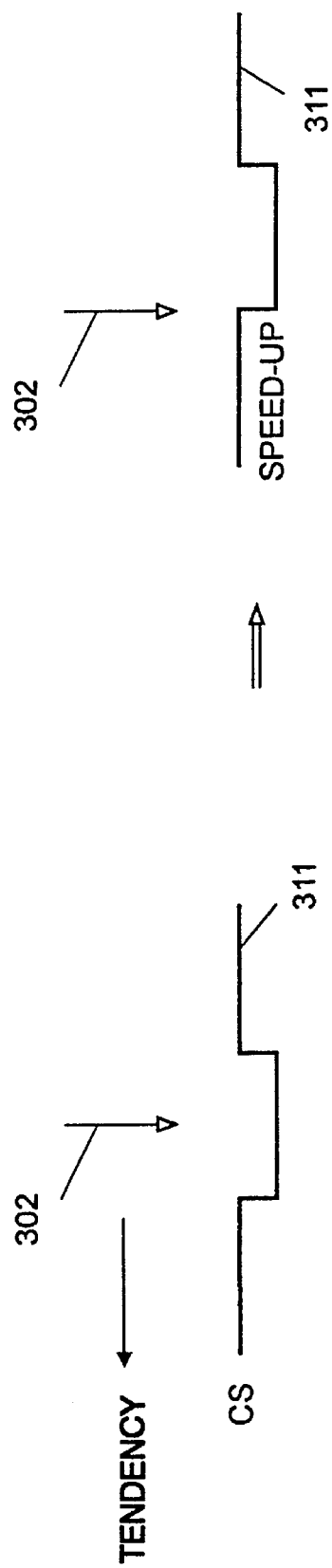
FIG. 8A
FIG. 8B

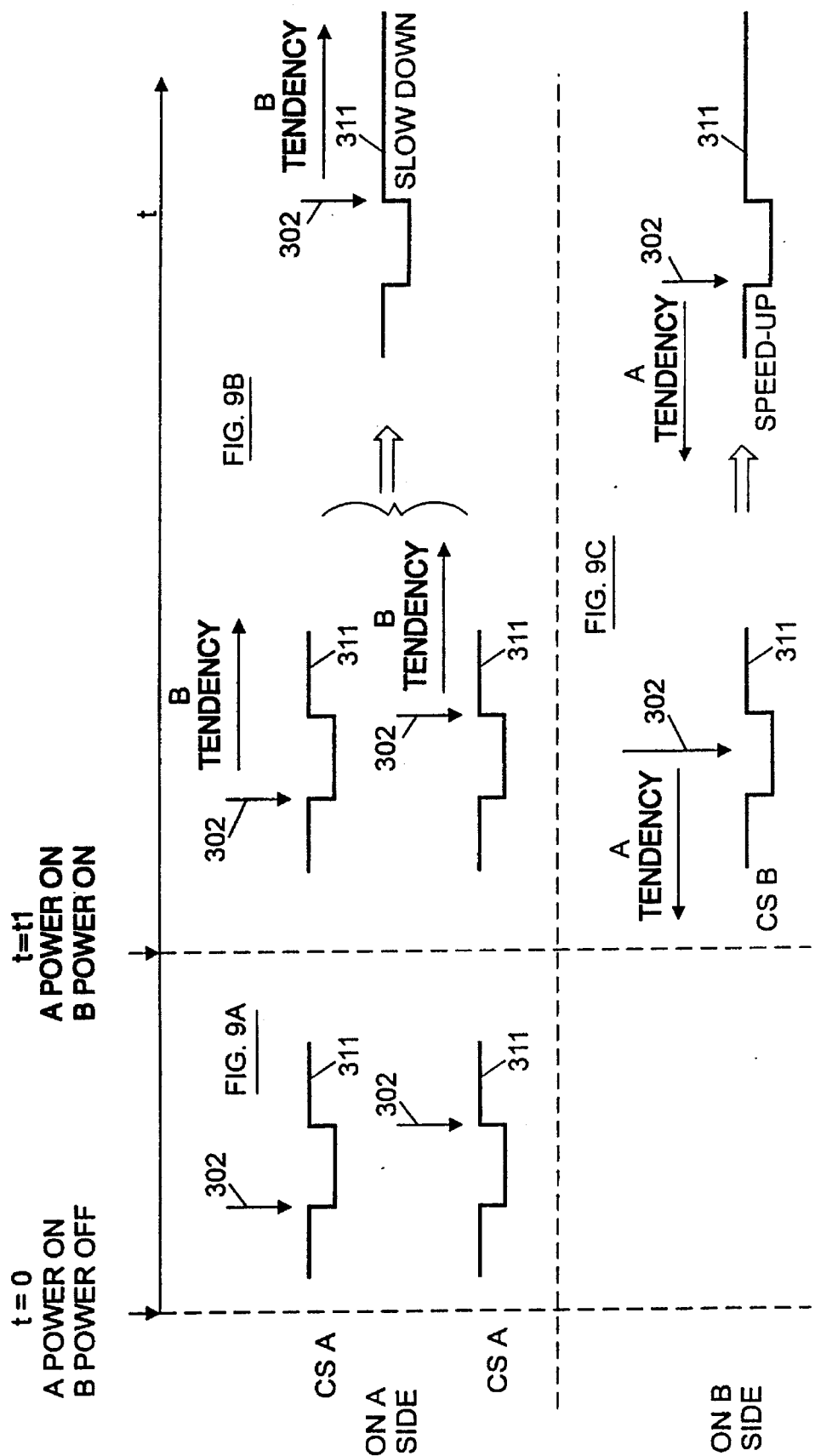

ADAPTER FOR THE CONNECTION TO A CLEAR-CHANNEL TELECOMMUNICATION NETWORK

The invention relates to digital data communications and particularly for an adapter for a clear-channel telecommunication network.

Digital communications are spreading out everywhere in the communication field. Integrated Services Digital Networks (I.S.D.N.) are, for instance developing rapidly. For I.S.D.N. networks, the synchronization is provided by the digital network, while the equipment thereto attached are considered as slave, i.e. transmits data at the rhythm of the receive clock which is provided by the network. Therefore, all equipments which are connected to the I.S.D.N. network are configured as "slave" operating at the rhythm of the clock provided by the network.

However, there may be some digital networks which do not provide any clock to the equipments which are thereto attached. Digital Networks conforming to the electrical CCITT Recommendation G703 may be "clear channel" (no framing structure), and two equipments which are communicating via such networks have to be synchronized together. In known systems, this synchronization is achieved in two main steps. Firstly the bit rate of every equipment is chosen to be as close as possible to the nominal frequency rate of the network. Practically, for networks operating at a nominal frequency of 2.048 Mbps for instance, the equipments are fitted with quartz elements ensuring a bit rate being equal to 2.048 Mbps at +/−50 parts per millions (PPM). Secondly, one adapter is configured as a "master" which internal clock is transmitted via the digital network to the other one which uses it for synchronizing its transmit clock. The latter is therefore considered as a "slave" while the former is considered as a "master". Such known systems involve the following drawback: since each adapter has to be configured as a "master" or as a "slave" a manual operation from the user is required, therefore increasing the complexity in the use of the system. Moreover, while in operation, and particularly during maintenance operations, the user or the operator of one adapter may not remember the actual configuration of his machine and will therefore have to call the operator of the other machine and check the actual configuration before proceeding further with the maintenance operations.

Therefore, the technical problem to be solved by the present invention is to provide a synchronization system for an adapter designed to be connected to a clear channel digital network, not providing the clock, without the need of a master/slave configuration.

A particular object of the present invention is to provide the synchronization circuits for an apparatus converting a EIA-449 interface to a G. 703 clear-channel interface at 2.048 Mbps by which the customers can connect the high speed serial adapter equipments to the digital leased line public carrier services operating at 2.048 Mbps. Since those customers are not compelled to set each machine in one master or slave configuration, the installation can be deeply improved.

SUMMARY OF THE INVENTION

This technical problem is solved by means of the adapter for a clear-channel digital network which has line interface circuits connected to the digital network operating at 2.048 MHz, and which extracts the receive clock existing on the network. The line interface circuits can be reset, thus causing the adapter to be disconnected from the line. A Digital Phase-locked Loop device DPLL (203), which is driven by a master clock at 16.384 MHz, provides the timing and synchronization signals to the line interface circuits. In the DPLL, the master clock is divided down to an 8 KHz internal INT clock signal, and compared with a reference signal at 8 KHz derived from and synchronized with the receive clock at 2.048 MHz extracted by the line interface circuits. The falling edge of the 8 kHz reference signal is used to sample the internally generated INT signal and a correction signal CS which has a correction window centered round the falling edge of the internal INT signal. According to the values of both samples, the DPLL decides to make either no correction, or speed-up or a slow-down correction. This is achieved by a shrink or a stretch of the master clock by half a period at one instant in the frame. Once brought into correction, the rising edge or the falling edge of the correction window is aligned with the falling edge of the reference signal at 8 KHz depending on the nature of the correction which has been introduced. When the adapter is powered-on, the line interface circuits is reset first, and then the DPLL. Therefore, after the adapter is connected to the line, the DPLL is initialized so that the reference signal and the internal signal has simultaneous falling edges occurring near the center of the window correction. Therefore, no correction is introduced and the mismatch between the frequencies of the reference signal and the internal clock derived from the master clock will result in a slow slide of the falling edge of the reference signal with respect to the position of the correction window, and eventually a correction whenever this falling edge moves beyond the correction window. The initialization of the DPLL immediately after the connection to the line ensures that, assuming that a first adapter has already been powered-on and connected to the clear-channel network, the synchronization process will evolve towards stable operating points for both adapters. Therefore, both adapters can communicate together even if they are both in a "slave" configuration. Any switch for a "master" or "slave" configuration is rendered unnecessary and the use of the adapter is made easier for the operator.

Preferably, the adapter will include a line interface module having an analog PLL for progressively transmitting the jitter introduced by said correction circuit to the digital network.

DESCRIPTION OF THE DRAWINGS

FIGS. 8A and 8B are diagrams illustrating the two distinctive operating points which are attained after the initialization step.

FIGS. 9A, 9B and 9C are timing diagrams illustrating the evolution of the operating points of the machine when the two adapters are connected to the network.

DESCRIPTION OF THE PREFERRED EMBODIMENT OF THE INVENTION

Figure 1:
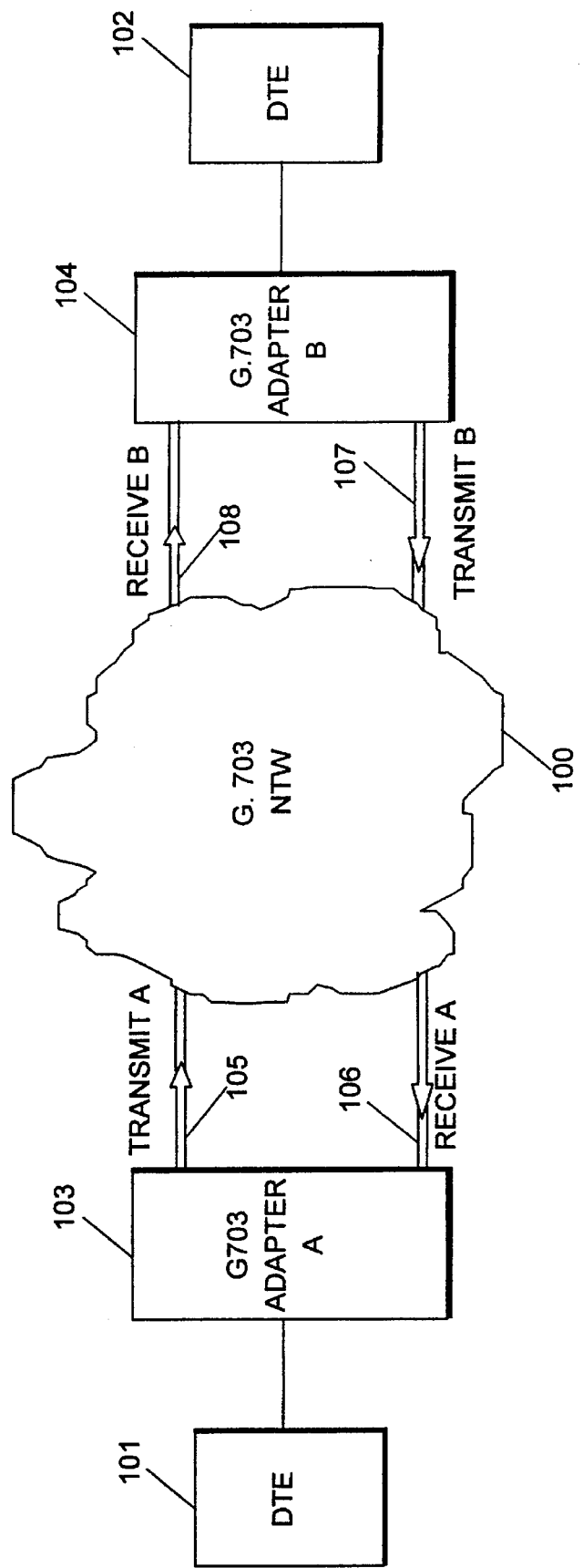
FIG. 1 illustrates a network topology involving a G. 703 clear channel digital network.

With respect to FIG. 1, there is pictured the technical environment of digital adapters which are communicating via a G. 703 Clear Channel network. As shown in the Figure, a Data Terminating Equipment 101 (DTE) is attached to an adapter 103 via its high speed serial adapter. The adapter 103 (hereinafter referred to as the adapter A) is connected to a G. 703 clear channel digital network via two Transmit (Xmit) and Receive (Rce) pairs 105 and 106. Similarly, at the other side, is connected a second DTE 102 exchanging data via a second adapter B 104 which is attached to the network by means of two Xmit and Rce pairs of wires 107 and 108.

Figure 2:
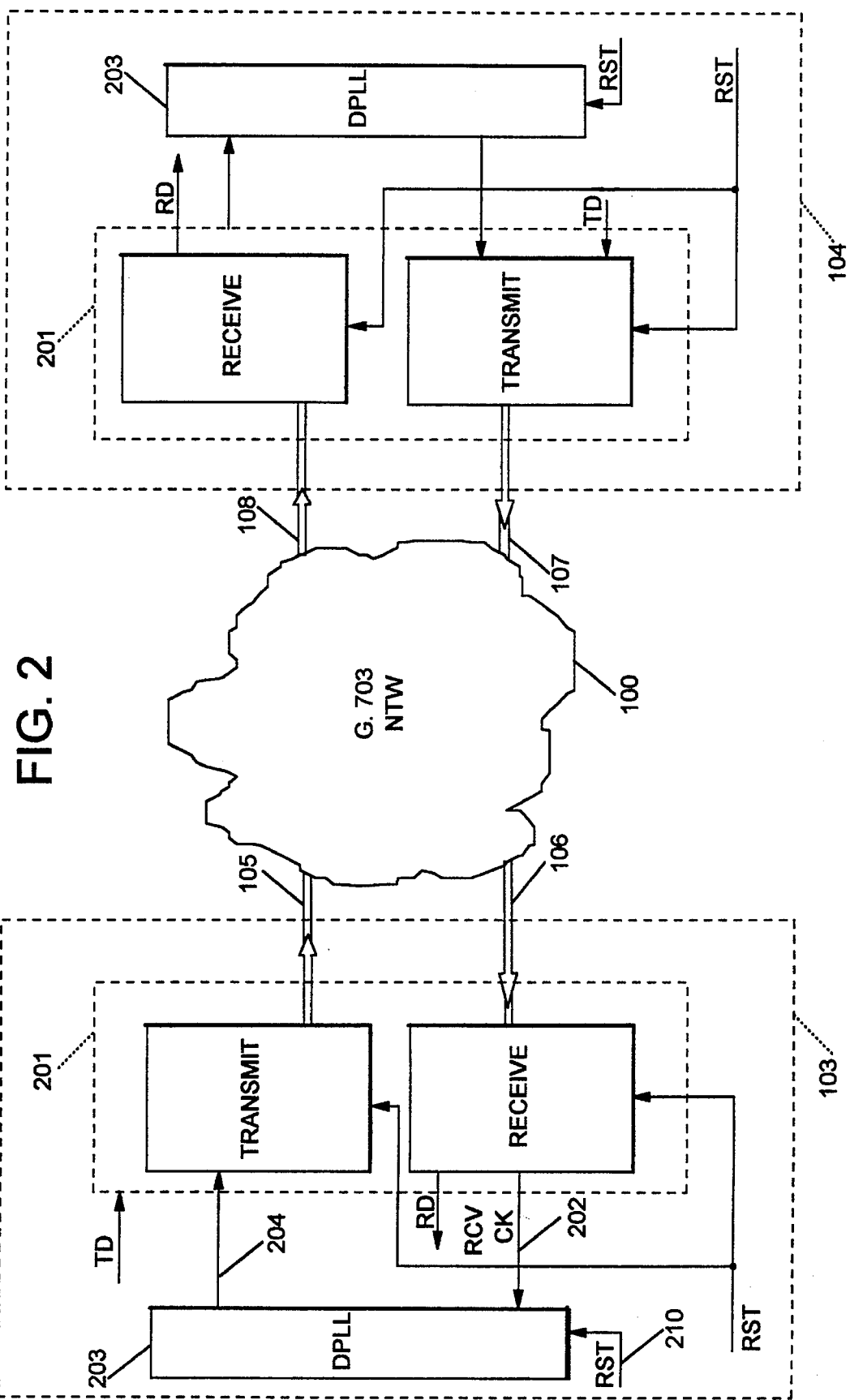
FIG. 2 illustrates the basic structure of an adapter for a G. 703 clear channel network according to the present invention.

FIG. 2 illustrates the basic structure of an adapter for a G. 703 clear channel network according to the present invention. For the purpose of the description, only one adapter, for instance the adapter 103, will be described. Adapter 103 includes a line interface module 201 having a transmit and a receive part for providing the analog attachment to the pairs of wires 105 and 106. In the preferred embodiment of the invention, a specific module manufactured by SIEMENS under the reference PEB2235 and known as a "ISDN Primary Access Transceive" or "IPAT" (trademark of SIEMENS) as used, but the reader should understand that the invention is not limited to the use of this specific module, and that any other equivalent line interface circuit providing the analog receive and transmit line interface functions to primary rate PCM carriers can be used in the invention. From the HDB3 signal which is received from pairs of wire 106, the receive part of line interface module 201 provides the extraction of data RD and also the receive clock appearing on lead 202. In the preferred embodiment of the invention, the receive clock appearing on lead 202 is a square wave clock signal having a frequency value of 2.048 MHz and is transmitted to one input lead of a Digital Phase locked loop device 203 (DPLL) which provides the timing and synchronization signals to the interface circuits for the primary multiplex digital transmission links, and also filters the low frequency jitter including wander. In the preferred embodiment of the invention, DPLL is a specific module which is manufactured by MITEL under the reference "MT8941: Advance T1/CEPT Digital Trunk PLL", but similarly as above, it should be understood that any equivalent device providing the timing and synchronization signals could be used for embodying the invention. From the receive clock at 2.048 MHz existing on lead 202, DPLL derives, as described hereinafter with details, a Xmit clock on a lead 204 operating at the same nominal frequency (2.048 MHz) which will be used by line interface circuit 201 for pulsing the data transmission to the network via Xmit pair 105. Both line interface 201 and Digital Phase Locked Loop device 203 are provided with a reset input which will be used for the synchronization process as described below.

Figure 3:
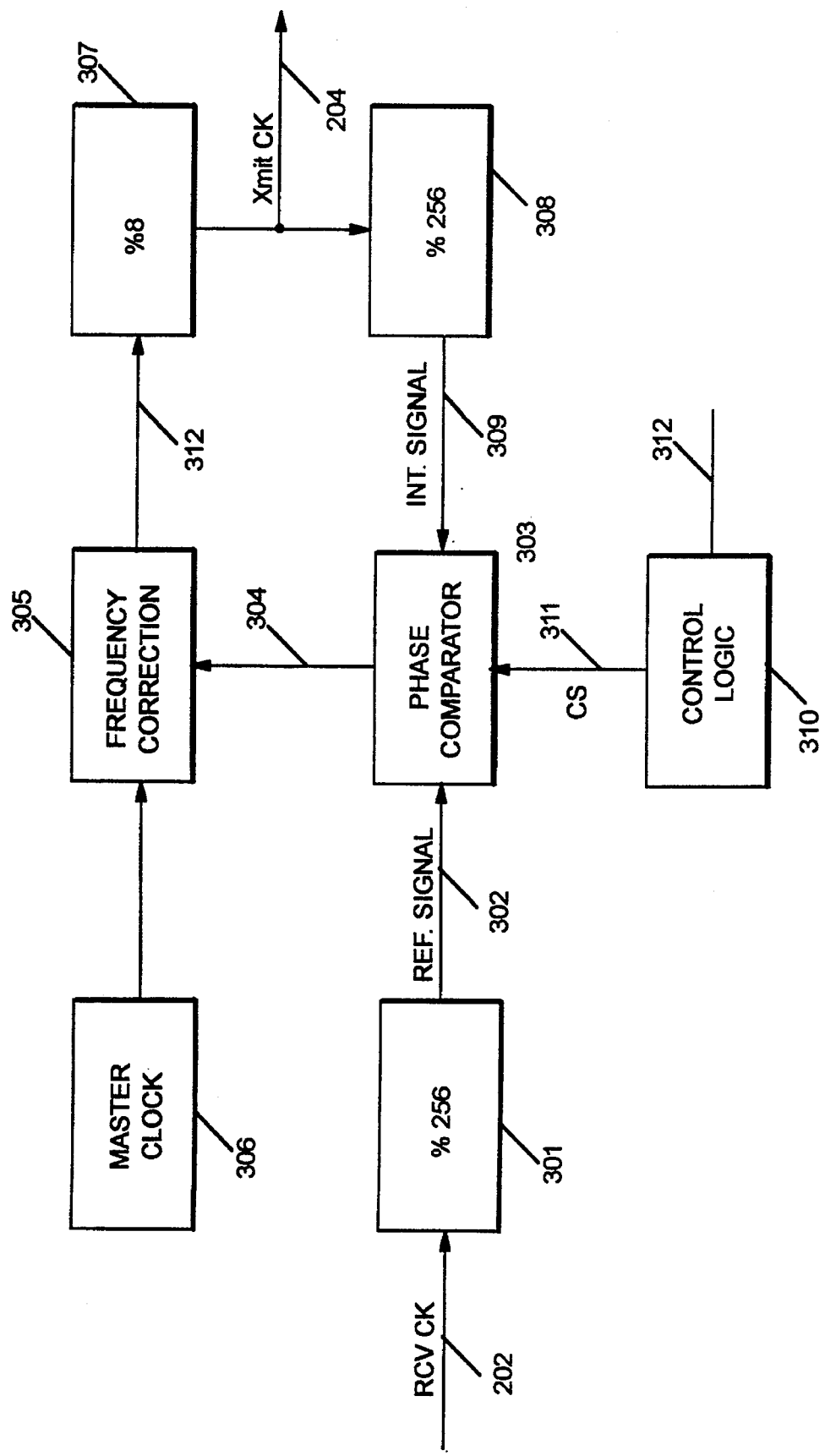
FIG. 3 illustrates the internal structure of the Digital Phase Locked Loop (DPLL) in the adapter according to the present invention.

FIG. 3 illustrates the basic internal structure of the digital Phase Locked Loop (PLL) 203 which will be useful for a full understanding of the invention. The receive clock is input in a divide by 256 circuit 301 which outputs a reference signal at a 8 Khz rate on a lead 302. The latter signal is transmitted to an input of a phase comparator circuit 303, which generates a control signal on a lead 304 for a frequency correction circuit 305 receiving a master clock signal at 16.384 Mhz from a master clock 306. Frequency correction circuit 305 generates a corrected clock signal derived from the master clock under control of phase comparator 303, which signal is divided by 8 by divider 307. The output of divider 307 generates the desired Xmit clock signal on lead 204 operating at 2.048 MHz, and is also transmitted to a second divide-by-256 circuit 308 which outputs a Internal (INT) signal at 8 KHz on a lead 309. INT signal is transmitted to a second input of phase comparator 303. At last a control logic 310 receives the corrected frequency existing on lead 312 and generates a Correction Signal (CS) on a lead 311 which will be used by phase comparator 303 for generating the control signal on lead 304 as described below. Dividers 301, 307, 308 are embodied by means of counters which can be reset by means of reset inputs (not shown in the figure) as described hereinafter. Similarly, control logic 310 is provided with a reset input lead (not shown). The reset of circuit 301, 307, 308 and control logic 310 performs the reset operations of the DPLL mentioned above with respect to FIG. 1.

Figure 4:
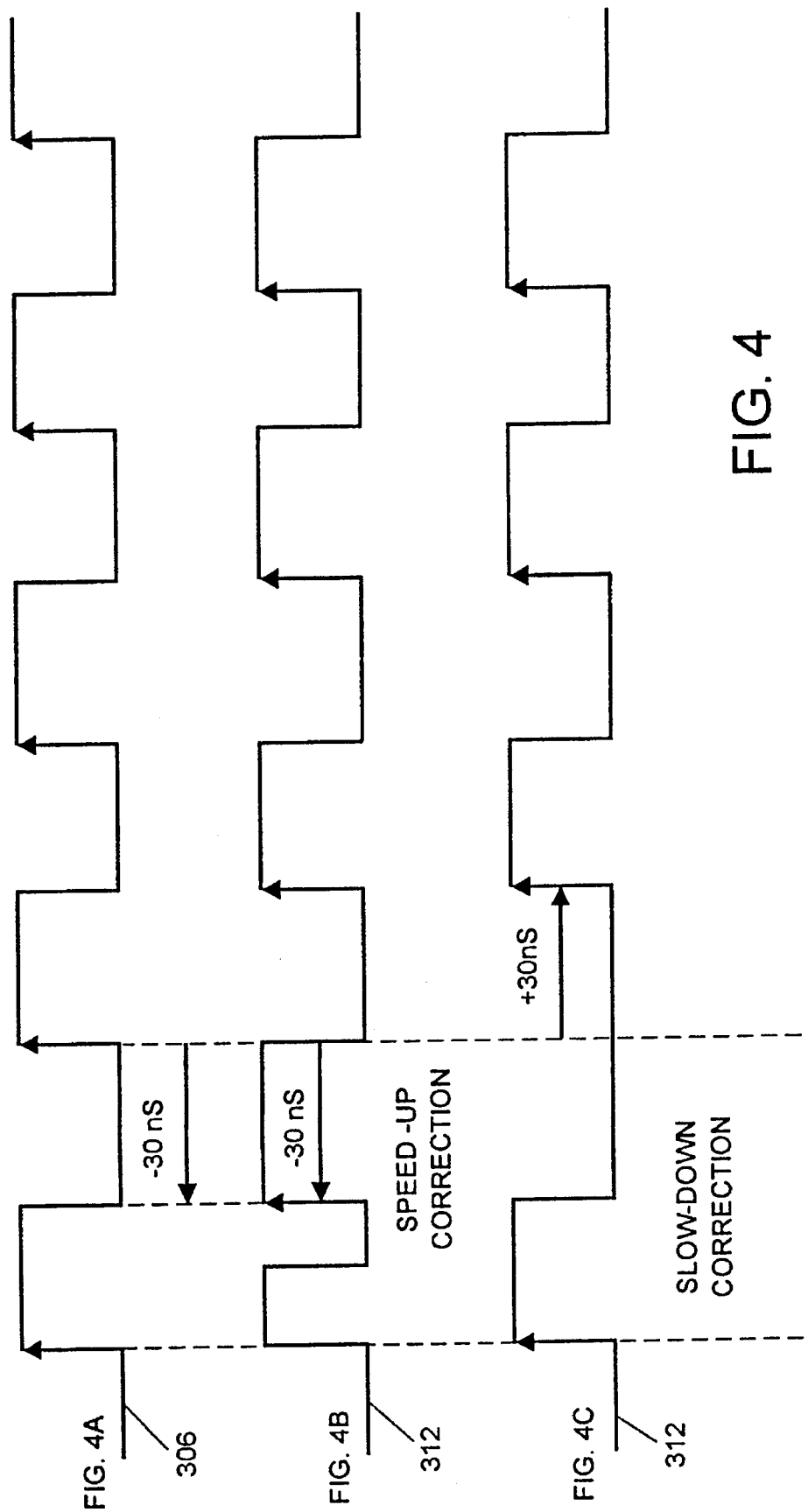
FIGS. 4 and 5 are timing diagrams of the signals in the DPLL.

Frequency correction circuit 305 is used for applying a correction on the master clock signal at 16.384 MHz generated by master clock 306. To achieve this, half a period of the 16.384 MHz clock is added or suppressed on the signal which is generated by master clock 306. The addition, or conversely the suppression, of one half-period of the master clock results in a speed-up, or conversely a slow-down, of the clock driving divide-by-8 circuit 307. The corrections which are performed on the master clock are illustrated in the timing diagrams of the FIG. 4. FIG. 4a shows the master clock 306 operating at 16.384 MHz. FIG. 4B illustrates the effect of a speed-up correction performed by frequency correction circuit 305, while the effect of a slow-down correction is pictured on FIG. 4c. It should be noticed that the corrections only occur, when the case, every 125 microseconds at the maximum, corresponding to the time which is required for the transmission of 256 bytes at 2.048 Mbps.

Figure 5:
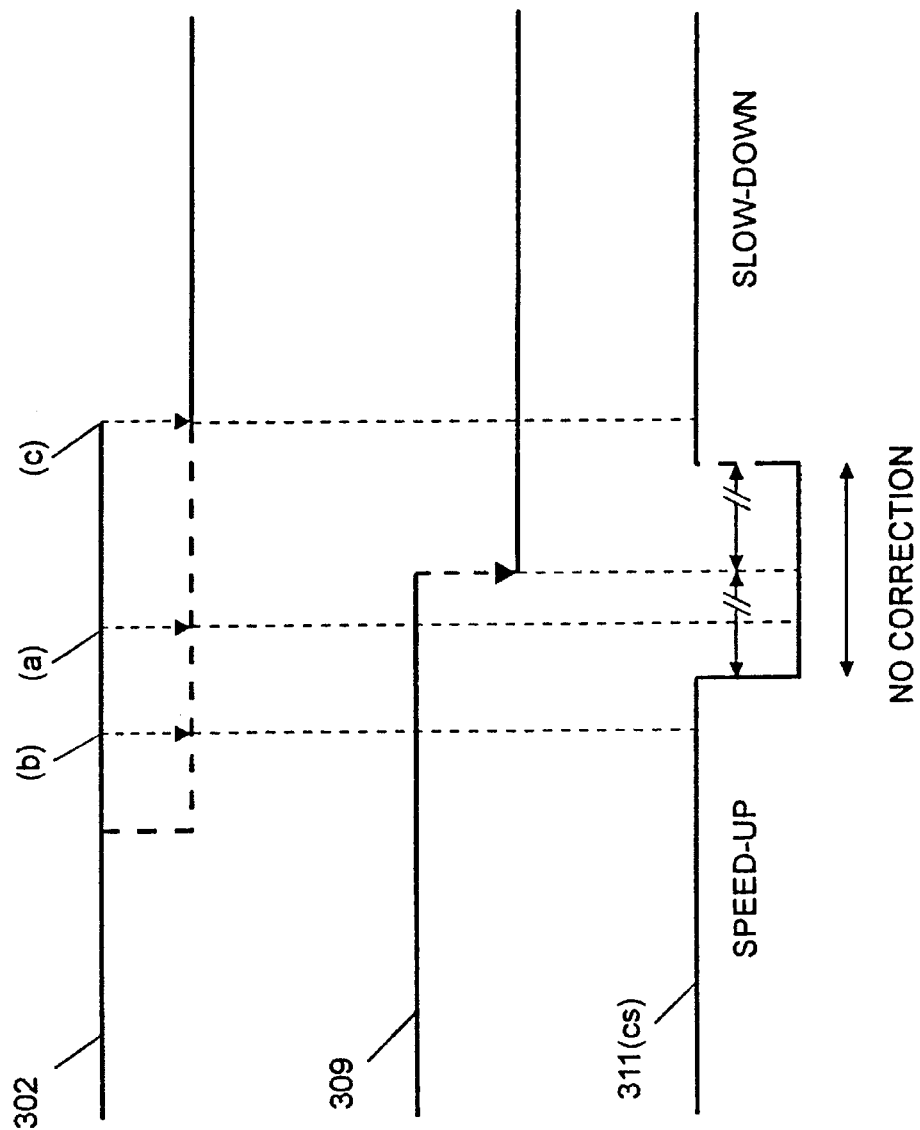

As mentioned above, Control Logic 310 generates a Correction Signal (CS) which is derived from the clock on lead 312. To achieve this, Control Logic produces a signal having a correction window, as illustrated in FIG. 5, which is centered around the falling edge of the signal 309. The width of the window, ie the time during which the signal is at a low level, is fixed to 30 microseconds. The generation of such a Correction Signal CS is performed by traditional elementary circuits, including dividers and counters producing the desired signal CS from the signal on lead 312, which circuits are well known to the skilled man and will not be described with further details.

With respect to FIG. 5, it will be described the operating of phase comparator 303. On the occurrence of the falling edge of the signal 302, phase comparator 303 samples the internal signal 309 produced by divider 308 and the Correction Signal CS on lead 311. As will appear below, this sampling occurs once in every frame that is to say every 125 microseconds. If CS sample is at a low level, indicating that the falling edge of the signal on lead 302 occurred within the correction window (case (a) in FIG. 5), then phase comparator 303 controls frequency correction circuit 305 so that no correction is introduced within the master clock generated by master clock 306 for this frame of 125 microseconds. On the contrary, if CS sample is at a high level, indicating that the falling edge of the signal on lead 302 occurred outside the correction window (cases (b) or (c) in FIG. 5), then phase comparator 303 generates a correction control signal on lead 304 so that frequency correction circuit 305 makes a speed-up or a slow-down correction depending upon the sampled value of the INT signal on lead

309. If the sample of the INT signal is at a low level (case (c) in FIG. 5), then phase comparator 303 causes frequency correction circuit 305 to stretch the master clock by half a period (i.e. about 30 nanoseconds) at one instant in the frame, as illustrated in the FIG. 4C. On the contrary, if the sample of the INT signal appears to be at a high level on the occurrence of the falling edge of signal 302 (case (b) in FIG. 5), then phase comparator 303 causes frequency correction circuit 305 to shrink the master clock by half a period at one instant in the frame, as illustrated in the FIG. 4B. Moreover, when a correction has occurred, all the counters included into circuits 307, 308, and 310 are reinitialized thereby resulting in a realignment of INT internal signal 309 and Correction Signal CS 311 on the falling edge of the reference signal on lead 302. More accurately, the rising edge of the CS signal (and simultaneously the falling edge of signal 309 positioned at the center of the window) is realigned on the falling edge of reference signal 302 when a slow-down correction was introduced on the master clock. Conversely, the falling edge of the CS signal (and simultaneously the falling edge of the signal 309 positioned at the center of the window) is realigned on the falling edge of signal 302 when a speedup correction was introduced on the master clock.

It appears that the two above mechanisms, the correction process performed by frequency correction circuit 305 and the realignment of INT and CS signals 309 and 311, are used together once in frame (every 125 microseconds when necessary) for providing the synchronization of the Xmit clock 204 on the Rce Clock on lead 202.

Figure 6:
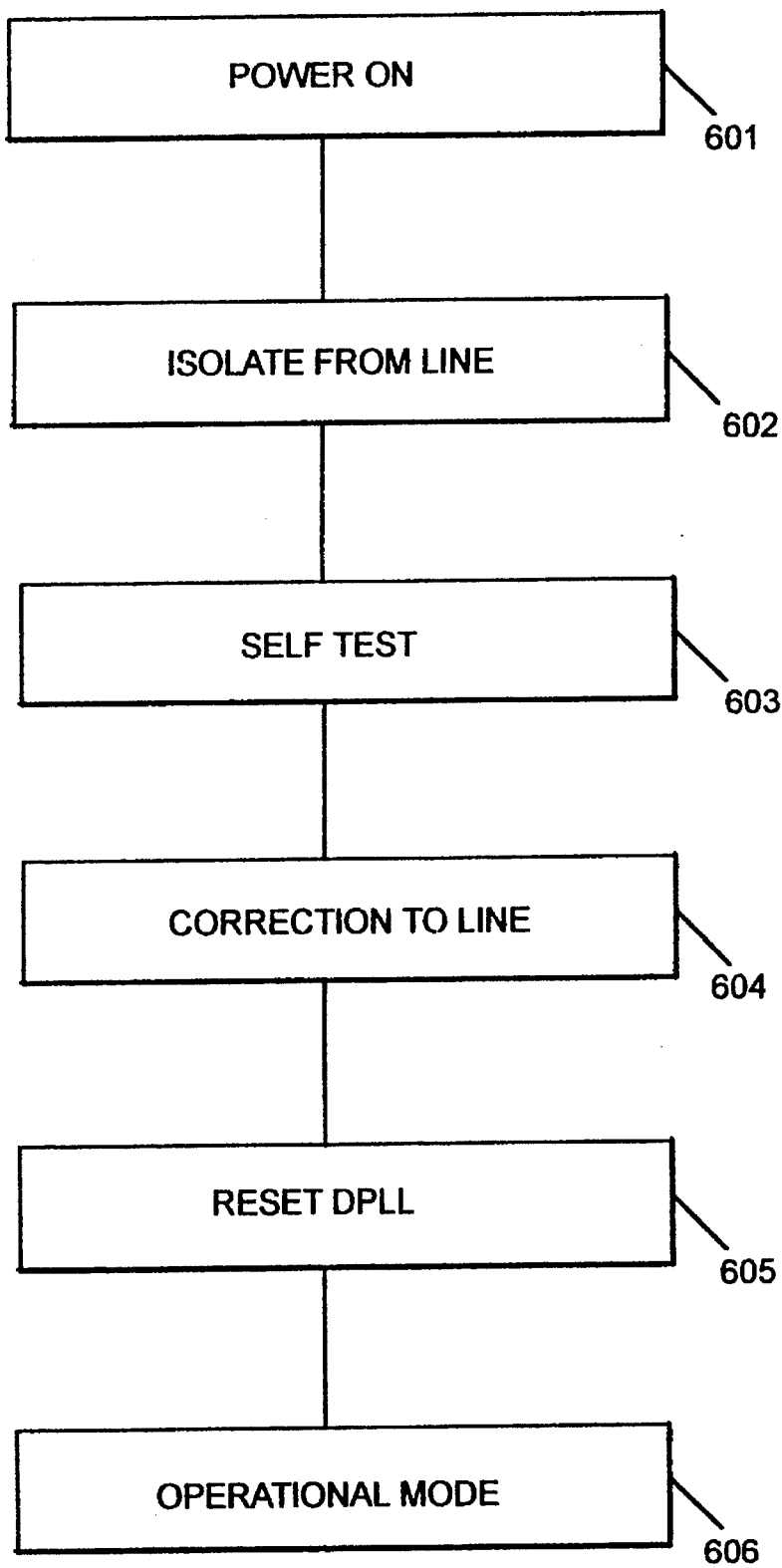
FIG. 6 is a flow chart illustrating the technical steps performed during the initialization period of the adapter.
Figure 7:
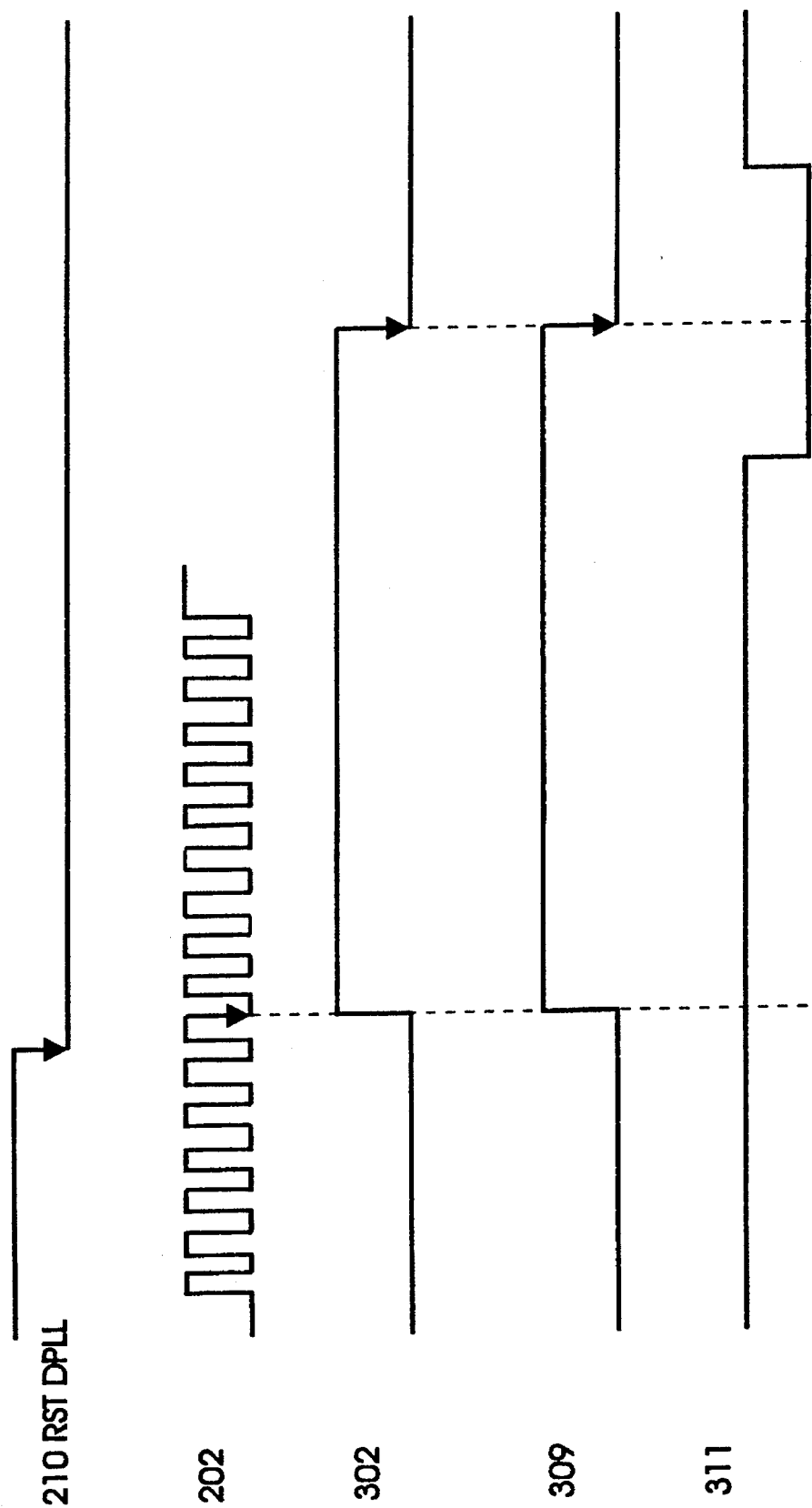
FIG. 7 are timing diagrams of the basic signals generated during the initialization period.

It will be described now the synchronization process according to the present invention. The general principle of system initialization described hereafter is to eliminate a situation where the reference signal at both sides would simultaneously be located near the same edge of the CS window, thus leading to a non-stable configuration where both adapters could either slow-down or speed-up. Let us assume that the first adapter A be connected to the digital network. FIG. 6 is a flow chart illustrating the technical steps performed during the initialization period of adapter 103 (A). After the power-on of the machine, step 601, the line interface circuit 201 of FIG. 2 is controlled so that the adapter is isolated with respect to the G. 703 pairs of wires, step 602. This is achieved by the activation of the RESET input command of the line interface circuit 201, thereby resulting in the outputs of the latter be set to a high-impedance status. Then, step 603, the machine initiates a self-test period where the parts and components are checked, e.g. the microprocessor, RAM and ROM storages (not shown in the figures), in order to detect an internal failure. Step 604, the RESET input lead of line interface circuit is dis-activated, thereby resulting in the connection of the line interface circuit 201 to the G. 703 network. From this instant, the data can be transmitted to the Xmit pair 105 at the rhythm of the Xmit clock existing on lead 204, and, conversely, the HDB3 analog signal received from the Rce pair 106 is demodulated and the data and receive clock are extracted from the modulated signal. Step 604 is then immediately followed by step 605 where the DPLL 203 is reset. This is achieved by the activation of the RESET input lead of the latter. Consequently, all the counters in the circuits 307, 308, 301 and Control logic 310 are initialized. From this instant, the signals conform to the timing diagrams which are described in FIG. 7 showing the signals on lead 210, 202, 302, 309 and 311 where it appears that the following falling edge of the reference signal 302 (occurring 125 microseconds later) will be centered on the correction window of signal CS on lead 311. The machine becomes operational, step 606. FIGS. 8A and 8B are diagrams illustrating the evolution of the synchronization process further to the centering of the falling edge of the reference signal on lead 302 and the correction window of CS signal on lead 311, with the assumption where the reference signal 302 appears slower than the internal signal on lead 309 which is pulsed by the internal master clock. Because of this difference of the frequency between those two signals, the falling edge of the signal 302, being first positioned at the center of the correction window of CS signal as illustrated in FIG. 7, slowly moves toward the rising edge of the correction window. It should be noticed that this moving appears very slow with respect to the difference of frequencies which can exist. For instance, in the worst case where the quartz elements (between the adapter A and the receive clock received from the network, or still naturally generated by line interface circuit 201 in the absence of any signal on line 106) only differs of 50 parts per millions (50 PPM) at maximum, the falling edge of the reference signal 302 will "attain" the rising edge of the clock window, i.e. the falling edge will occur at the same instant as the occurrence of the rising edge of the correction window, after a delay of about 2500 frames that is to say a period of approximately 300 milliseconds. This evolution is represented in FIG. 8A. When the falling edge of reference signal 302 occurs outside the correction window, or more accurately when the falling edge occurs at an instant where the CS is high in the slow-down portion of the signal, then phase comparator 303 generates a control signal on lead 304 which causes frequency correction circuit to stretch the master clock by half a period as illustrated in FIG. 4C. The slow-down correction which is introduced results in a correction of about 30 nanoseconds in the master clock which corresponds to a value being substantially superior to the difference of frequency between the quartz elements. For instance, it should be noticed that, in the worst case where the difference of the frequency values is of the order of 50 PPM, the delay appearing on the slower clock is only of 6 nanoseconds every frame of 125 microseconds. In this case, a 30 nano correction should occur only every 5 frames of 125 microseconds.

As mentioned above, the stretching of the master clock signal is also accompanied by the realignment of the rising edge of the correction window (and also the realignment of the falling edge of the INT signal 309 which must remain centered on the correction window) on the falling edge of the reference signal 302. From this instant, the DPLL keeps its operating point where the falling edge of the 302 signal remains confined near the rising edge of the correction window, as illustrated in the right portion of FIG. 8A.

FIG. 8B illustrates the reverse case where the reference signal on lead 302 appears faster than the INT signal on lead 309 which is derived from the master clock. After the completion of the initialization of the counters included in the dividers 301, 307, 308 and logic circuit 310, the falling edge of the reference signal will appear centered with respect to the correction window on CS signal on lead 311, as illustrated in FIG. 7. Then, because of the slight difference in the values of the frequencies of the two signals, there appears a slow moving of the falling edge of the reference signal on lead 302 with respect to the center of the correction window. Indeed, the falling edge of signal 302 will move towards the falling edge of the correction window. Whenever, this falling edge occurs "outside" the correction window (ie at an instant where the CS signal is high in the speed-up portion), then phase comparator circuit 303 initiates an elementary speed-up correction resulting in the shrink of the master clock by half a period (appr. 30 nanoseconds). Then, the falling edge of the correction window (also with that of INT signal on lead 309 which falling edge must remain centered on the correction window) is realigned on the falling edge of the reference signal 302. From this instant, the machine A remains synchronized on the receive clock extracted from the digital network (assuming that the latter produces such a clock in the absence of any communication with a second adapter) or the internal clock which is generated by line interface circuit 201. In this second case however, in contrary to the first case where the master clock was faster than the reference clock thereby resulting in an operating point of the type illustrated in FIG. 8A, the operating point is characterized by a diagram as illustrated in FIG. 8B.

Therefore it appears that, for both cases, the synchronization remains established between the first adapter 103 which is connected to the digital network whatever are the difference in the frequencies in the specified ranges.

When a second adapter is connected to the network, the process described in reference with FIG. 6 is performed for that second adapter. Therefore, similarly than what was described above, the connection of the G. 703 network to the adapter by line interface circuit referred to in step 604 is immediately followed by the initialization of the DPLL of the second adapter, step 605. This initialization should occur immediately, i.e. practically before the operating point of the first adapter is moved from one side of the correction window, e.g. the rising edge of the window near the slow-down region, to the other side of the window (e.g. the falling edge of the window near the speed-up region). This rapid reset of the second DPLL will ensure that, as will be described hereinafter with details, the synchronization process of both adapters, each one being controlled by the other, will not be instable. As it will appear below, the stability of the whole synchronization process is maintained since, at the instant when both adapters communicate through the G. 703 clear-channel, the two operating points of the first adapter and that of the second adapter are not on the same "side" of the correction window. On the contrary, the rapid succession of step 604 and 605 in the second adapter which is connected will assure that the operating point of the first adapter is still set on its previous state while the second adapter has its operating point set on the "middle" of the correction window of its DPLL.

Operating mode step 606 for the second adapter is preceded by the initialization of all the counters which are included inside the Digital Phase Locked Loop device 203 of the second machine. The timing diagrams are then similar to those illustrated in FIG. 7 until the second machine becomes operational, step 606.

This synchronization process will be particularly described with details with respect to the timing diagrams of FIG. 9A, 9B and 9C showing the evolution of the operating points of the two adapters 103 and 104 after the connection of the second adapter to the G. 703 channel. It will be assumed, for clarity's sake but the same demonstration could be done with the other assumption, that the master clock of the adapter 103 (A), which was first powered, is faster than that of the adapter 104 (B). Before the second adapter 104 (B) is powered, adapter A has one among the two operating points pictured in the right part of FIG. 8A or 8B depending upon the difference between the frequency of the master clock of adapter 103 (A) and the clock signal on lead 302 which is either derived from the digital network (if the latter produces one when the second adapter is not connected) or that is naturally generated on lead 202 by the PLL of the line interface circuit 201. Those two operating points of the adapter 103 (A) prior to the operating of the second one, is also pictured in FIG. 9A. When the second adapter 104 is set in operating mode, after the initialization of its digital PLL circuit 201 and corresponding to the instant t1 on FIGS. 9a, 9b and 9c, the falling edge of the signal 302 is aligned with the "middle" of the correction window of CS signal in this adapter, as illustrated in FIG. 7. Therefore, no correction is performed on the master clock of the second adapter by its frequency correction circuit 305, and the latter adapter emits data at its own 2.048 MHz rhythm which is directly derived from its internal master clock 306. The G. 703 Digital Network being clear-channel, these data transmitted from the second adapter 104 (B) are received at the same rate by the first adapter 103 (A). Depending upon the difference of frequencies between the master clocks of adapter (A) 103 and adapter (B) 104, the operating point of adapter (A) 103 may possibly move to the second operating point. This will occur if the difference in frequency between the master clock of A and the clock of the network prior to the connection of adapter B (assuming that the network generates a clock when the second adapter is not connected has the opposite sign of the difference in frequency between the master clock of adapter (A) 103 and that of adapter (B) 104. In the FIG. 9B, illustrating the case of an adapter (B) 104 having a master clock being slower than that of adapter (A) 103, the final operating point of adapter A will be characterized by a falling edge of signal 302 being close to the slow-down region of the CS signal 311 of that adapter. Therefore, if the initial operating point of adapter A was that illustrated in the upper part of FIG. 9B, that is to say the falling edge of signal 302 occurring near the speed-up region of the CS signal, then this adapter appears to switch from the first operating point to the second. On the contrary, if the initial operating point of adapter A was that illustrated in the downer part of FIG. 9B, that is to say in which the falling edge of signal 302 occurs near the slow-down region of the CS signal, then no transition appears in the operating point.

With respect to adapter (B) 104, as depicted in FIG. 9C, from the instant t1 where this adapter becomes operational, the falling edge of signal 302 inside its DPLL 203 will move from the position at the center of the correction window to one among the two preceding described stable operating points. Since the master clock of adapter (B) 104 has been assumed slower than that of master clock of adapter (A) 103, the final operating point appears to be characterized by the falling edge of signal 302 occurring near the speed-up region of CS signal, near the falling edge of the CS signal on lead 311.

As a consequence, both adapters are subject of an evolution towards a stable and final operating point. Once the final points are attained, the adapter having the slower master clock has its DPLL being characterized by a falling edge of the reference signal being close to the speed-up region of the CS signal, ie close to the falling edge of the CS signal. On the contrary the adapter having the faster master clock remains at an operating point where the falling edge of signal 302 occurs near the rising edge of the CS signal. Therefore, both adapters remain synchronized whatever are the difference in frequencies of the master clock in the considered range of values (2.048 MHz at 50 ppm).

It should be noticed that, at the beginning of the operation, corresponding to the delay required for one adapter to switch from one operating point to the second operating point, an elastic buffer should be provided so that the data sent by the adapter having the faster clock are not lost. If no elastic buffer can be used, the adapter must be provided with means ensuring that the actual communication of data begins when both adapters have reached their final operating point. This can be achieved by delaying the actual transmission of data of at least some hundreds of milliseconds.

The jitter generated by DPLL 203 is depending on the correction which is applied on the master clock 306. Since, in the preferred embodiment the correction is half a period of the 16.384 MHz clock, a jitter of about 30 nanoseconds is introduced within the line interface circuits 201 when a correction is applied by frequency correction circuit 305. For a transmission rate at 2.048 MHz, this jitter is equal to 0.0625 Unit Interval (UI) where UI=1/2.048 MHz=488 ns. In order to comply with CCITT Recommendations G. 703, the peak to peak output jitter should be lower than 1.5 UI in the frequency range (20 Kz, 100 KHz). As the jitter which is generated by DPLL device 203 is equal to 0.0625 UI, the transmitter and receiver 201 should add a jitter which is lower than:

1.5 −0.0625=1.4375 UI for CCITT Rec. G. 703;

The 30 nanoseconds jitter which is generated by frequency correction circuit 305 is transmitted to the line Interface Circuit which also incorporates an analog Phase Locked Loop for generating the Xmit signal. In the preferred embodiment of the invention, for preventing the latter jitter to be immediately transmitted to the network, Line interface Circuit 201 will advantageously be embodied with an analog PLL or still with a Digital PLL having a correction step being small with respect to the 30 nanoseconds jitter. Therefore, the whole 30 nanoseconds jitter value is progressively transmitted to the network during a period of several bit times.

It should also be noticed that the jitter can be lowered by increasing the value of the master clock (for instance by using a 32 MHz clock) with respect to the value of the Xmit clock.

We claim:

1. An adapter for connecting a data terminal device to a digital network channel in which the channel operates at a nominal frequency and supplies no timing information to the adapter, characterized in that the adapter includes circuitry for dynamically synchronizing itself with data signals supplied from another adapter connected to the channel, comprising:

a line interface circuit having a transmit and a receive part for providing an analog attachment to said network, a master clock for generating master clock signals, a receive clock derived from said data signals received from the network, a reference signal derived from the receive clock, a Digital Phase-locked Loop (DPLL) circuit driven by the master clock for providing timing and synchronization signals to said line interface circuit, said DPLL circuit having means for dividing the master clock down to an internal (INT) clock, phase comparison means for comparing said internal INT clock with the reference signal, means for generating a Correction Signal (CS) having a correction window centered around said internal INT clock, and frequency correction means operative when the reference signal occurs outside the correction window for inserting or suppressing at least one master clock signal depending on which side of the correction window the reference signal occurs, means for resetting said line interface circuit to an initial state, means for operating the resetting means at power-on of the adapter, means responsive to operation of the resetting means for initializing said DPLL circuit to an initial synchronizing state in which said internal (INT) clock is aligned with said reference signal near a center point of the correction window, whereby a difference between the receive clock and the master clock results in a drift of the INT clock with respect to the window of the correction signal.

2. Apparatus according to claim 1 characterized in that said DPLL circuit further includes:

first dividing means for dividing said receive clock to generate said reference clock, and wherein the means for dividing the master clock down to an internal (INT) clock further comprises second dividing means for dividing said master clock down to a transmit (XMIT) clock signal, and third dividing means for dividing said transmit clock signal down to said internal INT clock.

3. Apparatus according to claim 1 or claim 2 further comprising means for operating the resetting means on every occurrence of a Request to Send (RTS) signal received from the data terminal device.

4. Apparatus according to claim 1 or claim 2 further comprising means for detecting a disconnection of the adapter with said network, and means responsive to the detecting means for operating the resetting means.

5. Apparatus according to claim 1 or claim 2 further comprising an elastic buffer for storing data received from the network, said elastic buffer being of sufficient capacity to store all data received from the network during a maximum time period required for the adapter to synchronize to a stable point with the data being received.

6. Apparatus according to claim 1 or claim 2 characterized in that said DPLL circuit provides timing and synchronization signals to said interface circuit for TI Primary Multiplex Digital transmission links.

7. Apparatus according to claim 1 or claim 2 characterized in that said DPLL circuit provides timing and synchronization signals to said interface circuit for CEPT Primary Multiplex Digital Transmission links.

8. An adapter for converting a data terminal serial interface to an interface conforming to CCITT standard G207 at 2.048 Mhz, including the apparatus according to claim 7.

* * * * *